Feb. 11, 1969

W. KATAVOLOS ETAL 3,427,446

LIGHTING DEVICE

Filed July 29, 1966

INVENTORS.
WILLIAM KATAVOLOS
SEYMOUR EVANS

BY Seidel & Gonda

ATTORNEYS.

INVENTORS.
WILLIAM KATAVOLOS
SEYMOUR EVANS
BY
ATTORNEYS.

Feb. 11, 1969  W. KATAVOLOS ETAL  3,427,446
LIGHTING DEVICE
Filed July 29, 1966  Sheet 3 of 5

INVENTORS.
WILLIAM KATAVOLOS
SEYMOUR EVANS
BY
ATTORNEYS.

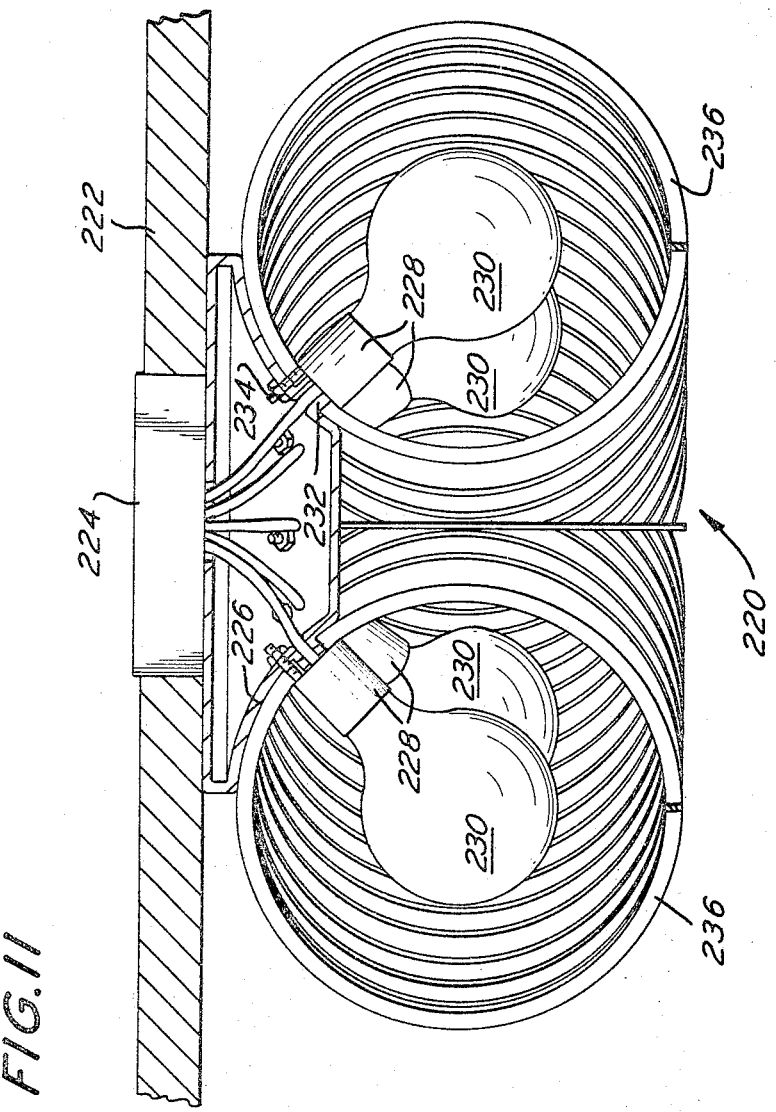

United States Patent Office 3,427,446
Patented Feb. 11, 1969

3,427,446
LIGHTING DEVICE
William Katavolos and Seymour Evans, New York, N.Y., assignors to Marvin Electric Manufacturing Co., Los Angeles, Calif., a corporation of California
Filed July 29, 1966, Ser. No. 568,900
U.S. Cl. 240—78         11 Claims
Int. Cl. F21v 7/00, 7/10, 7/18

ABSTRACT OF THE DISCLOSURE

A lighting device comprising a housing of plastic or glass having a lamp socket with an electric light bulb connected to the socket. A doughnut-shaped coiled diffuser is supported by the housing in a position so that light from the electric light bulb projects through the space between the diffuser coils and reflects off surfaces of the coils.

---

This invention relates to a lighting device, and more particularly, to a device for illuminating an area in the form of a light fixture which may be recessed in a ceiling, supported on a surface on the ceiling, supported as a pendant, mounted on a wall bracket, be a portable fixture, a floor lamp, a spotlight, etc.

The lighting device of the present invention incorporates a novel diffuser in the form of a helical coil such as that disclosed in U.S. Patent 2,415,012, the disclosure of which is incorporated herein by reference. The lighting device of the present invention includes a housing, shade, or cone, of plastic or glass having a lamp socket with an electric light bulb connected to the socket. The spiral coiled diffuser is supported by the housing in a position so that light from the electric light bulb projects through the space between the diffuser coils and reflects off surfaces of the coils.

The lighting device of the present invention includes novel housing arrangements for receiving the spiral coil diffuser which desirably in accordance with certain embodiments of the present invention is supported by the housing with a snap-in connection, or screw-in device, or by retaining clips. In this manner, the diffuser may be readily removed for cleaning, changing bulbs, etc. Also, the present invention facilitates the use of glass or plastic shades or housings which are transparent, translucent and/or opaque. The translucent glass or plastic housing, in particular, are intended to be in novel colors which facilitate adaptation with or are compatible with modern coloring schemes.

It is an object of the present invention to provide a novel lighting fixture which is compatible color-wise with modern lighting schemes.

It is another object of the present invention to provide a lighting device which incorporates a spiral coiled diffuser through which light may be projected and reflected off the surfaces thereof.

It is another object of the present invention to provide a novel lighting diffuser adaptable for use in a wide variety of lighting devices including recessed ceiling fixtures, surface mounted ceiling fixtures, spotlights, wall fixtures, pendants, floodlights, exterior fixtures, luminous ceilings.

It is another object of the present invention to provide a novel lighting fixture which is simple, easy to construct, inexpensive, and which utilizes a reflector or diffuser which has ornamental characteristics.

Other objects will appear hereinafter.

For the purpose of illustrating the invention, there are shown in the drawings forms which are presently preferred; it being understood, however, that this invention is not limited to the precise arrangements and instrumentalities shown.

FIGURE 11 is a sectional view of another embodiment of the present invention.

Figure 1:
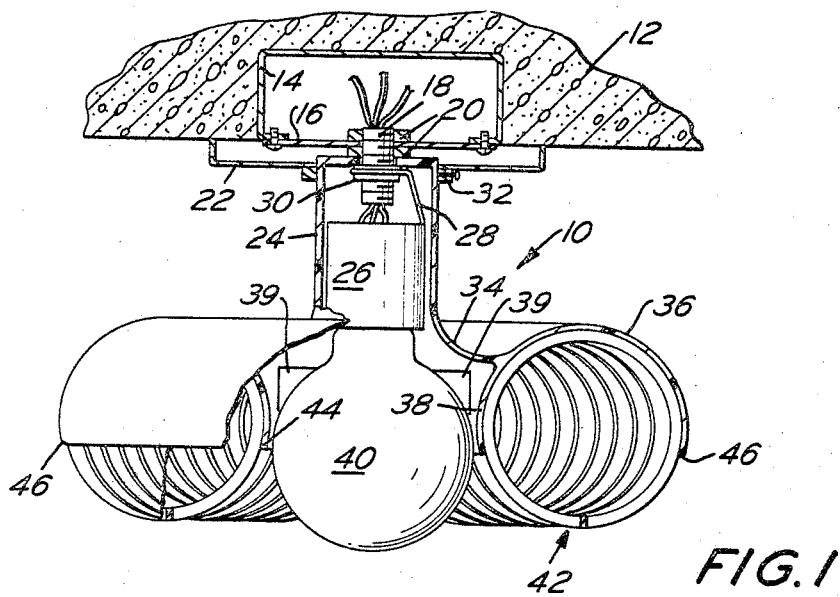
FIGURE 1 is an elevation view, partly in section, of one embodiment of the present invention.
Figure 2:
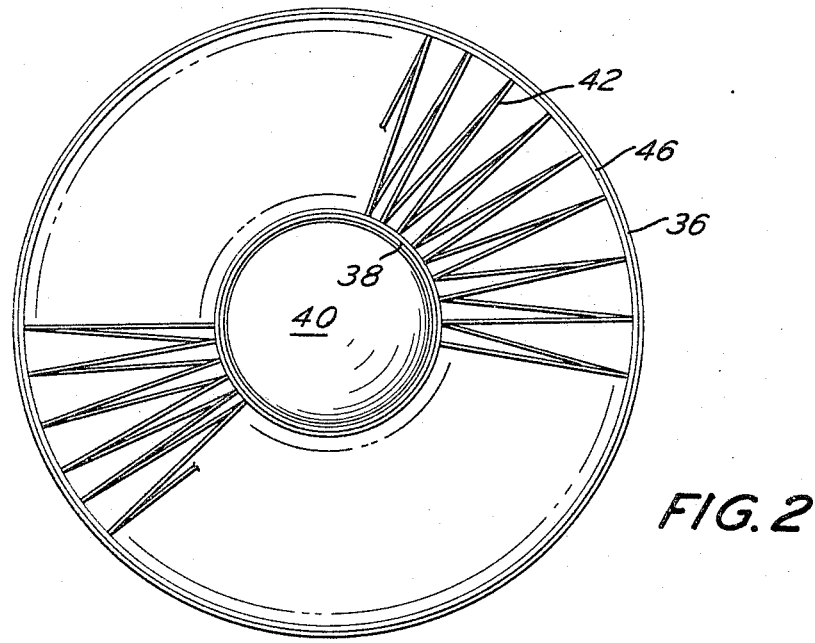
FIGURE 2 is a bottom plan view of the lighting device in FIGURE 1.

Referring to the drawing in detail, wherein like numerals indicate like elements, there is shown in FIGURE 1 a lighting device designated generally as 10. It will be apparent to those skilled in the art that device 10 may be used singularly or in combination with other identical devices to form a row, group or cluster.

The lighting device 10 is supported from a ceiling 12. An outlet box 14 is mounted within a recess in the ceiling 12. A mounting strap 16 is connected by screws to the open end of the box 14. A nipple 18 with external threads extends through a hole in the strap 16. Lock nuts 20 on opposite sides of the strap 16 are threaded to the outer periphery of nipple 18. A canopy or escutcheon 22 contacts the ceiling 12 and obscures the box 14 as well as the strap 16.

The lighting device 10 includes a housing having a cylindrical wall portion 24 and an end wall extending radially inwardly therefrom. The end wall is provided with a hole through which the nipple 18 extends. A socket 26, such as a Leveiton socket, is supported from the nipple 18 by means of an arm 28. A lock nut 30 threaded onto the nipple 18 retains the above-described in assembled relationship. A ring 30 adjustably connected to the outer periphery of wall portion 24 retains the canopy or escutcheon 22 in the illustrated disposition.

The lower end of wall portion 24 is provided with an outwardly flared portion 34. The flared portion 34 is connected to a generally semi-circular diffuser support having an outer portion 36 and an inner portion 38. The inner portion 38 terminates in a lower free edge 44. The outer portion 36 terminates in a lower free edge 46. The arcuate extent of portions 38 and 36 is slightly more than 180° such as approximately 210°.

An electric light bulb 40 is connected to socket 26 and disposed radially inwardly from portion 38. A spiral coiled diffuser 42, which may be constructed as disclosed in the abovementioned patent, is snapped into the support formed by the portions 38 and 36. Since the transverse dimension between edges 44 and 46 is slightly less than the diameter of diffuser 42, the latter is readily snapped into its support due to its ease of deformability.

If desired, the portion 38 may be provided with apertures 39 to facilitate transmission of light from the bulb 40 for reflection off the inner surface of curved portion 36. The housing including wall portion 24, its end wall, flared portion 34, outer portion 36 and inner portion 38 may be made from almost any polymeric plastic material which may be opaque, translucent or transparent as desired. If portion 38 is transparent, it will not be necessary to provide the apertures 39. Light from electric bulb 40 projects through the space between adjacent coils of diffuser 42 and off the side and end faces of the diffuser 42. Diffuser 42 is preferably made from spring steel which is rectangular in cross section.

Other cross sections for diffuser 42 may be provided such as elliptical cross sections. It is preferred to paint or otherwise color the diffuser 42 so as to match or contrast with the color of the housing. Diffuser 42 may also be provided as a machined transparent or translucent plastic part so as to "edge-light" glow along its entire spiral periphery.

Figure 3:
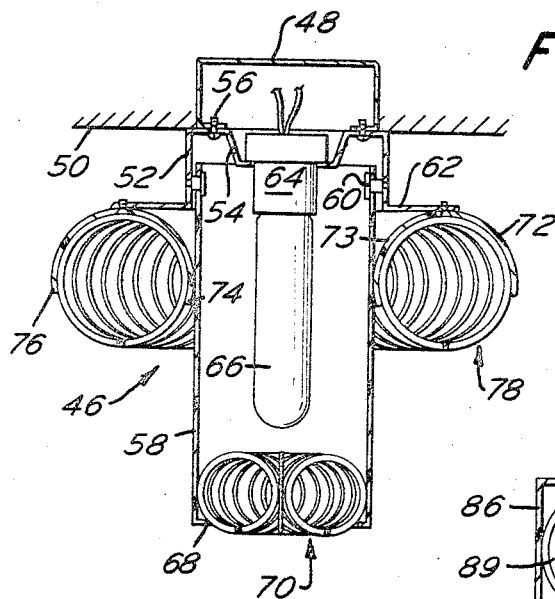
FIGURE 3 is a sectional view of another embodiment of the present invention.

In FIGURE 3, there is illustrated another lighting device in accordance with the present invention designated generally as 46. The device 46 includes an outlet box 48 mounted within a recess in a ceiling 50. A housing having a cylindrical wall portion 52 has its end wall 54 connected to an in-turned lip on the box 48 by means of screws 56. A transparent cylinder 58 has its upper end connected to the wall portion 52 in any convenient manner such as by rivets 60. A diffuser 70, corresponding to diffuser 42, is removably supported within the cylinder 58 by means of a radially inwardly directed flange 68 at its lower end. Thus, the diffuser 70 is supported from the housing 52 by cylinder 58.

A socket 64 is supported by the end wall 54 on the housing. An electric light bulb 66 is connected to the socket 64. Light from bulb 66 projects downwardly through the space between coils of diffuser 70 and radially outwardly through the transparent cylinder 58.

The housing includes a flared portion 62 extending from the lower edge of the cylindrical wall portion 52. The flared portion 62 is connected to a generally semicircular diffuser support having an outer portion 72 and an inner portion 73. The portions 72 and 73 are preferably made from a transparent polymeric material and respectively have lower free edges 74 and 76. As illustrated, edge 74 is lower than edge 76. The arcuate distance between edges 74 and 76 is greater than 180° such as 210°.

A diffuser 78, identical with diffuser 70 but longer in size, is snap-fitted into the support provided by portions 72 and 73 and removably supported thereby. Thus, each of the diffusers 70 and 78 are removably supported by the housing. Light from bulb 66 may project through the transparent cylinder 58 and transparent portion 73 for reflecting off the surfaces of diffuser 78 and through the spaces between adjacent coils thereof.

Figure 4:
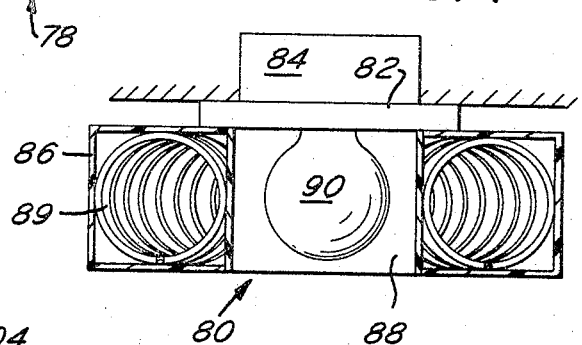
FIGURE 4 is a sectional view of another embodiment of the present invention.

In FIGURE 4, there is illustrated another embodiment of the lighting device of the present invention designated generally as 80. The device 80 includes a cylindrical housing 82 connected to an outlet box 84 recessed within a ceiling. Within housing 82 and box 84, there is provided a socket, not shown, to which is connected an electric light bulb 90. A transparent diffuser support, made from any convenient material, such as an acrylic resin, is supported by the housing 82. Support 86 is ring-shaped in plan view and U-shaped in cross section. The open inner periphery of diffuser 86 is closed by means of a sleeve 88. Support 86 is connected to the housing 82 in any convenient manner.

A spiral coiled diffuser 89, identical with any one of the above-mentioned diffusers, is disposed within the support 86. Light from bulb 90 may project downwardly without passing through any other medium and may also project radially outwardly through the sleeve 88 and support 86 for reflection off the surfaces of diffuser 89 and through the space between adjacent coils thereof.

Figure 5:
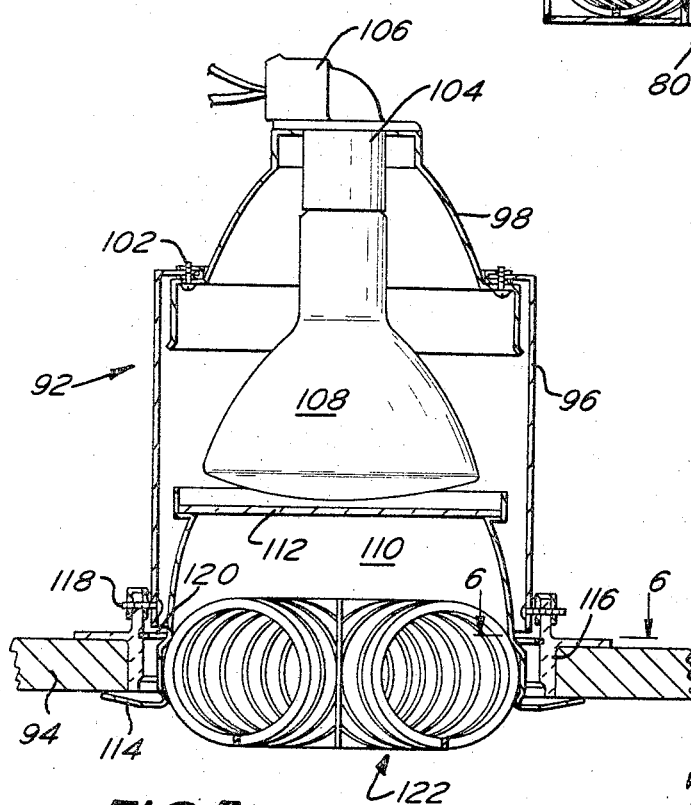
FIGURE 5 is a sectional view of a recessed lighting fixture in accordance with another embodiment of the present invention.

In FIGURE 5 there is illustrated a lighting device in according with the present invention in the form of a recessed lighting fixture designated generally as 92. The device 92 is recessed in a ceiling 94 and includes a generally cylindrical opaque housing 96 which may be made from any convenient material such as aluminum, steel, etc. The housing 96 is provided with a dome 98 removably connected thereto by means of screws 102. An outlet box 106 and a socket 104 are supported at the upper end of the dome 98. An electric light bulb 90 is connected to the socket 104 for projecting light downwardly.

Figure 6:
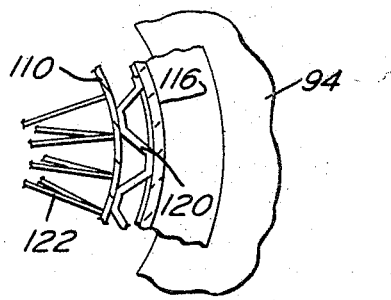
FIGURE 6 is a sectional view taken along the line 6—6 in FIGURE 5.

A support cone 110 is provided within the housing and projects through the opening in the ceiling 94 so that a flange 114 on the cone overlies the adjacent portion of the ceiling 94. The upper end of the cone 110, below the bulb 108, is provided with a support flange on which is supported a color filter 112. A plaster frame 116 is provided within the opening in ceiling 94 and has a flange overlying the upper surface of ceiling 94. Frame 116 is removably connected to the housing 96 by means of screws 118. The cone 110 is connected to the plaster frame 116 by way of a piano spring 120 as shown more clearly in FIGURE 6. The spring 120 facilitates a frictional retention of the cone 110 within the housing. Between the area on cone 110 wherein it contacts the spring 120, and the flange 114, the cone 110 is provided with a concave portion into which a diffuser 122 is snap-fitted and removably supported. Diffuser 122 corresponds to any one of the above-mentioned diffusers.

In place of a frictional coupling between the cone 110 and plaster frame 116, other connections may be utilized. For example, screws may be utilized to interconnect frame 116 and flange 114. As described above, cone 110, filter 112, and reflector 122 are readily removable as a unit for facilitating cleaning, changing bulb 108, etc. Light from bulb 108 projects downwardly through the filter 112, through the space between adjacent coils of diffuser 122 and reflects off the surfaces thereof.

Figure 7:
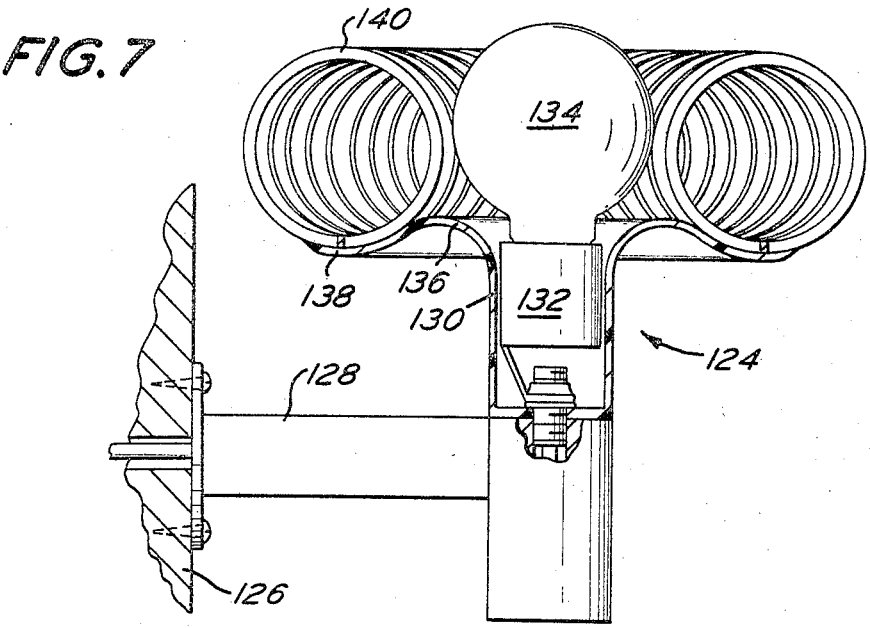
FIGURE 7 is a sectional view of another embodiment of the present invention in the form of a wall mounted fixture.

In FIGURE 7, there is illustrated another embodiment of the present invention designated generally as 124. The lighting device 124 is supported from a wall 126 by means of a hollow bracket 128 removably connected to the wall in any convenient manner such as by screws. The lighting device 124 includes a housing having a cylindrical wall portion 130 which may be made from a plastic material as described above in connection with the housing illustrated in FIGURE 1. A socket 132 is supported within wall portion 130 in the same manner as described above in connection with lighting device 10 and has connected thereto a bulb 134. The upper edge of wall portion 130 is provided with an outwardly flared portion 136 terminating at its periphery in an annular concave portion 138.

A diffuser 140, corresponding to any one of the above-described diffusers, is supported on the concave portion 138. Reflector 140 may be removably or fixedly secured to the concave portion 138 in any convenient manner such as by screws, adhesive, etc. It will be noted that the outer diameter of concave portion 138 is substantially smaller than the outer diameter of reflector 140. The upper surface of concave portion 138 and flared portion 136 may be a reflective surface.

Figures 8, 9:
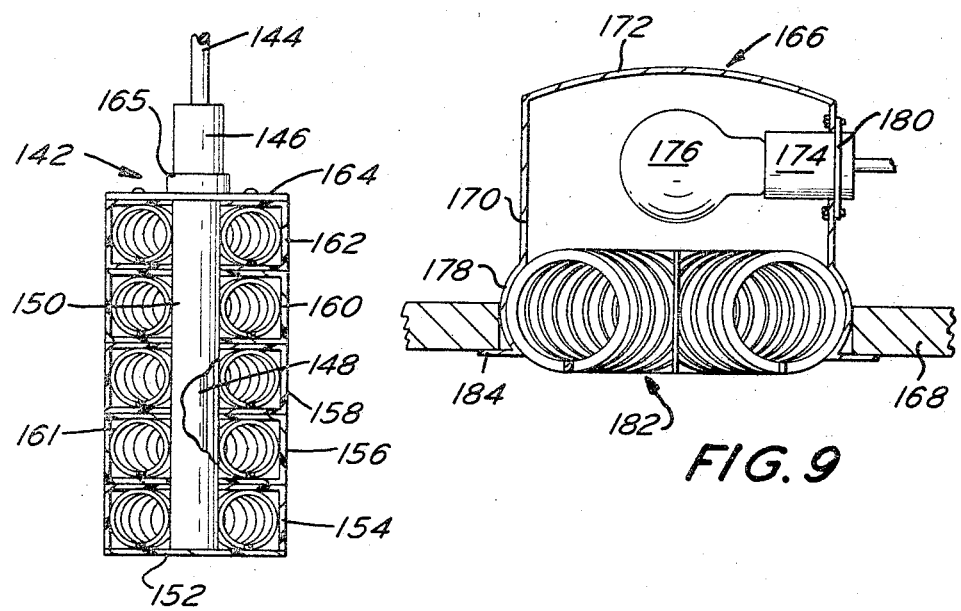
FIGURE 8 is a sectional view of another embodiment of the present invention in the form of a pendant fixture.
FIGURE 9 is a sectional view of another embodiment of the present invention in the form of a recessed lighting fixture.

In FIGURE 8, there is illustrated another embodiment of the present invention in the form of a pendant lighting device designated generally as 142. Lighting device 142 includes a housing 146 supported by a cord 144. An electric light bulb 148 is connected to socket in housing 146. A transparent sleeve 150 surrounds bulb 148.

A transparent generally cylindrical diffuser support 154 having a bottom wall 152 is provided. Support 154 is also provided with an apertured top wall. Sleeve 150 is connected to either the top or bottom wall of the support 154 in any convenient manner. Diffuser supports 156, 158, 180 and 182, all corresponding to support 86 and of the same outer diameter as support 154, are telescoped over the tube 150. A greater or lesser number of such supports may be telescoped over the tube 150 as desired. A plate 164 is connected by screws or the like to the top wall on support 162. Plate 164 is provided with a collar 165 threadedly or otherwise removably coupled to the housing 146. By interrupting the connection between collar 165 and housing 146, the lighting device may be moved downwardly so as to expose the bulb 148 in the event that it is necessary to remove the bulb 148. A diffuser 161, corresponding to any of the above-described diffusers, is provided within each of the supports 154, 156, 158, 160, and 162.

Any convenient device such as a snap ring, flange, or the like may be provided at the upper end of tube 150 so that it overlies the upper surface on the support 162. Since the tube 150 is connected to the support 154 and overlies the upper surface on the support 162, it will be readily apparent that the various supports will be retained in an assembled relationship. Light from the bulb 148 projects radially outwardly through the transparent sleeve 150, through the space between adjacent coils on the various diffusers, off the surfaces of the diffusers, and outwardly through the transparent diffuser supports 154-162 inclusive.

In FIGURE 9, there is illustrated another embodiment of the lighting device of the present invention in the form of a recessed lighting fixture designated generally as 166. The lighting device 166 includes a housing 170 having a dome 172. The dome 172 preferably has a reflective inner surface. A cylindrical wall portion of the housing 170 supports a socket 174 secured to a mounting plate 180. Plate 180 may be secured to the housing by screws or the like. An electric bulb 176 is connected to the socket 174.

The housing 170 is generally cup-shaped. Intermediate the dome 172 and a flange 184 which overlies the ceiling 168, the housing 170 is provided with a concave portion 178. A diffuser 182 is snap-fitted into the concave portion 178. Diffuser 182 corresponds to any one of the above-identified diffusers. Housing 170 may have a force-fit in the opening within the ceiling 168. Light from bulb 176 may directly, or indirectly by reflection off the inner surface of dome 172 project downwardly through the spaces between adjacent coils of the diffuser 182 and reflect off the surfaces of diffuser 182.

Figure 10:
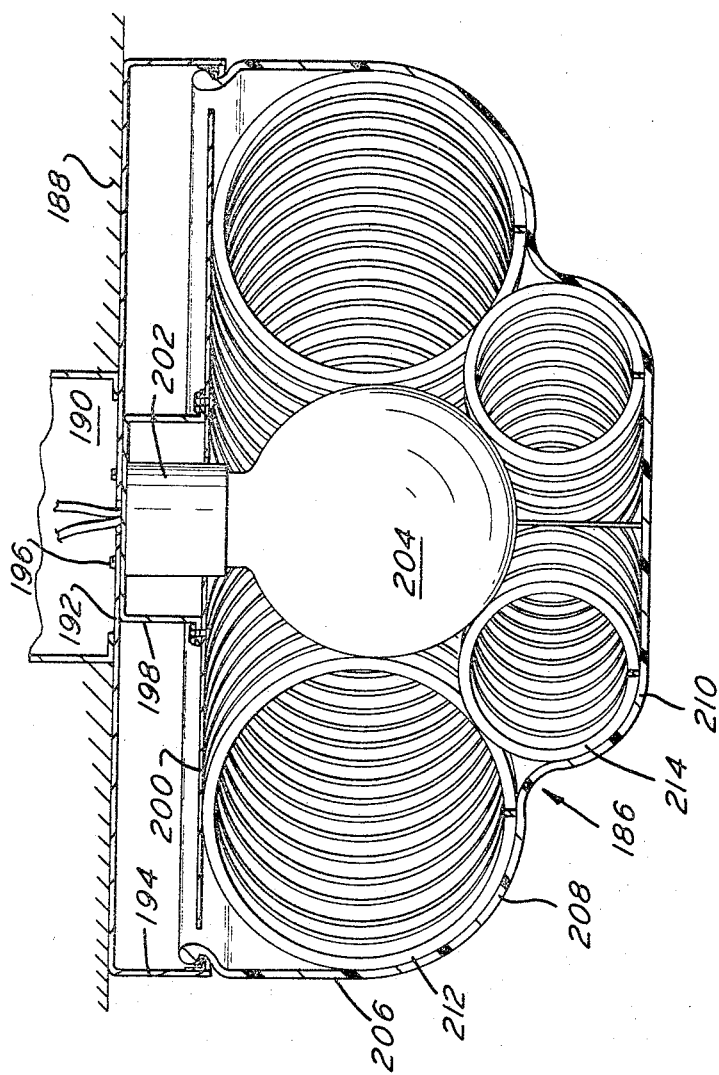
FIGURE 10 is a sectional view of another embodiment of the present invention.

In FIGURE 10, there is illustrated another embodiment of the lighting device of the present invention in the form of a surface mounted light fixture designated generally as 186. Lighting device 186 includes an outlet box 190 mounted within a recess in the ceiling 188. A housing having a generally cylindrical wall portion 194 has a bottom wall 192 connected to the outlet box 190 by means of screws 196. A diffuser retainer 198 is also connected to the outlet box 190 by screws 196. A plate 200 is connected to the retainer 198 and lies in a generally horizontal plane.

At least one socket 200 is supported from the outlet box 190 and receives an electric light bulb 204. A plurality of sockets each receiving a bulb may be provided if desired. A globe 206 which is generally cup-shaped but with concave portions 208 and 210 has its upper edge removably coupled to the housing wall portion 194 by means of a conventional spring clip. Globe 206 may be made from a transparent, translucent, or frosted polymeric plastic material.

A spiral coiled diffuser 212 is supported by the concave portion 212 in surrounding relationship with respect to the bulb 204. The plate 200 limits the upward extent of the diffuser 212 and has its undersurface shiny or otherwise coated so as to reflect light downwardly through the diffuser 212. A second diffuser 214 of smaller size is supported by the concave portion 210 and intermeshed with the diffuser 212. Diffusers 212 and 214 may be any one of the above-mentioned diffusers. Hence, light from bulb 204 may project downwardly and radially outwardly through the spaces between adjacent coils of the diffusers and may reflect off the surfaces of the diffusers.

In FIGURE 11 there is illustrated another embodiment of the lighting device of the present invention designated generally as 220. Device 220 is surface mounted on ceiling 222 and includes housing 226 connected to outlet box 224. A plurality of sockets 228 are connected to housing 226 at peripherally spaced locations. Each socket is provided with a bulb 230.

The sockets 228 have a recess on their bottom surface receiving a hollow nipple 232 on the housing 226. The nipples provide for orientation of the sockets, provide a gap between the sockets and the housing, and facilitate coupling electrical wires to the sockets. A screw 234 mechanically couples each socket 228 to the housing 226. A spiral coiled diffuser 236, corresponding to the above diffusers, is provided. It will be noted that the bulbs and sockets are within the coils between the inner and outer periphery of the diffuser 236. A portion of diffuser 236 extends through said gap.

In the above-illustrated embodiments of the present invention, the source of light was referred to as an electric light bulb. It will be appreciated by those skilled in the art that other sources of light such as a fluorescent bulb may be utilized. This may be accomplished, for example, by having the spiral coiled diffuser surrounding the fluorescent bulb. As will be apparent from the above, the spiral coiled diffusers are generally doughtnut-shaped. The diameter of the coils of the diffusers may be increased or decreased as desired. Where the diameter of the coils of the diffusers is about three inches, we have used spring steel having a thickness of .025 inch, with the coils being formed from material which is rectangular in cross section and having a radial dimension of about one-eighth of an inch for the side faces of the coil.

The light projected through the diffusers and off the side faces of the diffusers gives a striking appearance to the lighting device. Various decorator color schemes may be provided by use of matching or contrasting colors. For example, the plastic housing in FIGURE 1 or the spun aluminum housing in FIGURE 9 may be colored black, while the diffusers associated therewith are colored bright gold. The lighting effect can be further modified by removing or substituting a different filter for filter 112 in FIGURE 5. It will be appreciated by those skilled in the art that the doughtnut-shaped diffusers are made as a length of spiral coiled material manipulated so that the free ends are connected together in any convenient manner, thereby forming the doughtnut-shape.

The present invention may be embodied in other specific forms without departing from the spirit or essential attributes thereof and, accordingly, reference should be made to the appended claims, rather than to the foregoing specification as indicating the scope of the invention.

We claim:
1. A lighting device comprising a housing, a lamp socket coupled to the housing, and a spiral coiled diffuser supported in a position so that light from a bulb connected to said socket will project through the space between adjacent coils of the diffuser and reflect off surfaces of the coils, a generally semi-circular retainer support open at its bottom end and having an arcuate extent slightly greater than 180°, said support being made from plastic, and said diffuser being doughnut-shaped and removably coupled to said support concentric with said socket in a position so as to surround at least a portion of a light bulb connected to the socket.

2. A device in accordance with claim 1 including a transparent sleeve radially inwardly from said support, said sleeve being connected at its upper end to the housing and adapted to surround a bulb connected to said socket, and a second diffuser supported by the lower end of said sleeve.

3. A lighting device comprising a housing, a lamp socket coupled to the housing, a toroidal-shaped coiled diffuser generally concentric with the axis of the socket and adjacent the socket so that light from a bulb connected to said socket will project through the space between adjacent coils of the diffuser and reflect off surfaces of the coils, said coils being rectangular in cross section, and a circular wall circumscribing the diffuser and supported by the housing, said wall being made of light transmitting material.

4. A device in accordance with claim 3 wherein said wall contacts the outer periphery of said diffuser.

5. A lighting device comprising a housing, a lamp socket coupled to the housing, and a spiral coiled diffuser in a position so that light from a lamp connected to said socket will project through the space between adjacent coils of the diffuser and reflect off surfaces of the coils, said diffuser being doughnut-shaped, and said diffuser being supported by said housing, said diffuser being supported by a transparent portion of the housing and concentric with the socket, and said diffuser being at least partially disposed within said transparent portion.

6. A lighting device comprising a housing, a bulb socket coupled to the housing, a spiral coiled diffuser supported in a position so that light from a bulb connected to said socket will project through the space between adjacent coils of the diffuser and reflect off surfaces of the coils, said diffuser being doughnut-shaped, means for coupling said diffuser to the housing for support thereby, a generally cone-shaped member extending into said housing, said diffuser being supported adjacent the lower edge of and by the cone-shaped member, and means on the cone-shaped member for supporting a filter in a position so that light will project through the filter and then through the space between adjacent coils of the diffuser.

7. A lighting device comprising a housing, a lamp socket coupled to the housing, a spiral coiled diffuser supported in a position so that light from a bulb connected to said socket will project through the space between adjacent coils of the diffuser and reflect off surfaces of the coils, said diffuser being doughnut-shaped, and means for coupling said diffuser to the housing for support thereby, said diffuser being made from translucent plastic.

8. A lighting device comprising a housing having an opening at one end, a lamp socket coupled to the housing, said housing having a generally concave wall circumscribing the portion thereof adjacent said opening, a spiral coiled toroid diffuser removably supported by said concave wall of said housing with a snap-fit, at least a portion of said housing being adapted to be recessed within a ceiling, whereby a lamp connected to said socket will project light through the space between adjacent coils of the diffuser and reflect off surfaces of the coils.

9. A lighting device in accordance with claim 8, wherein said housing is a cup-shaped dome having a reflective inner surface, said concave wall engaging and supporting the outer periphery of said coil diffuser.

10. A lighting device in accordance with claim 9, wherein the coils of said toroid diffuser define a circle lying in a horizontal plane adjacent the lowermost end of said housing, said plane intersecting said concave wall of said housing.

11. A lighting device comprising a housing, a bulb socket coupled to the housing, said housing having supporting means adjacent the lowermost end thereof, a spiral coiled toroid diffuser removably supported by said supporting means, the axes of the coils of said toroid diffuser defining a circle lying in a horizontal plane adjacent the lowermost end of said housing and intersecting said supporting means, at least a portion of said diffuser projecting below said housing, whereby a bulb connected to said socket will project light through the space between adjacent coils of the diffuser and reflect off surfaces of the coils.

References Cited

UNITED STATES PATENTS

| 1,085,750 | 2/1914 | McMichael | 240—102.1 |
| 1,636,980 | 7/1927 | Bennett | 240—102.1 |
| 2,179,161 | 11/1939 | Rambusch et al. | 240—78 |
| 2,218,731 | 10/1940 | Tuck et al. | 240—78 |
| 2,435,678 | 2/1948 | Goebel | 240—102 |
| 2,530,361 | 11/1950 | Price | 240—46.41 |
| 2,745,001 | 5/1956 | Guth | 240—9 |
| 2,837,632 | 6/1958 | Lipscomb | 240—78 |
| 3,210,535 | 10/1965 | Fuchs | 240—102.1 |

FOREIGN PATENTS 520,764    1/1956    Canada.

NORTON ANSHER, *Primary Examiner.*

RICHARD M. SHEER, *Assistant Examiner.*

U.S. Cl. X.R.

240—102, 73, 46.41